United States Patent [19]

Das

[11] 3,708,578

[45] Jan. 2, 1973

[54] COMPOSITION AND METHOD FOR INHIBITING THE GROWTH OF ANIMAL PATHOGENS

[75] Inventor: Naba K. Das, Columbia, Md.

[73] Assignee: W. R. Grace & Co., New York, N.Y.

[22] Filed: Jan. 21, 1971

[21] Appl. No.: 108,639

[52] U.S. Cl. ................... 424/141, 424/143, 424/317
[51] Int. Cl. .............................................. A61k 27/00
[58] Field of Search ........................................ 424/141

[56] References Cited

OTHER PUBLICATIONS

Merck Index, eighth edit., (1968) page 302.

*Primary Examiner*—Sam Rosen
*Attorney*—Kenneth E. Prince

[57] ABSTRACT

Isobutyrates in combination with water soluble copper salts are effective in inhibiting the growth of animal and poultry pathogens.

9 Claims, No Drawings

COMPOSITION AND METHOD FOR INHIBITING THE GROWTH OF ANIMAL PATHOGENS

As is well-known in the agricultural industry various animals suffer malfunctioning of the digestive tract with resulting diarrhea. This, of course, leads to poor performance as pertains to weight gain and frequently even death of the animal. A general term applied to this disease is "scours." It is uncertain which pathogen is responsible for this condition, and although *Escherichia coli* is normally found when the condition appears, other pathogens such as *Candida albicans* and *Salmonella* species are also involved. It is also well-known that in certain animals diarrhea is a frequent symptom of *Candida albicans* infection. Heretofore, then, even though it has been evident that infections with certain pathogenic organisms were hindering the growth of animals, there has been little success in curing the problem.

As is evident, then, pathogenic organisms which cause malfunctioning of the digestive tract and which adversely affect the weight gain of animals cause serious economic losses to the agricultural industry.

Accordingly, it is an objective of this invention to provide a means for inhibiting the growth and proliferation of animal pathogens. More specifically, to inhibit the growth of animal pathogens which prevent normal weight gain in animals. It is, more specifically, a further object of this invention to inhibit the growth of *Candida albicans*, *Salmonella* species, and *Escherichia coli*. It is still a further object to increase the rate of weight gain in animals. Other objectives of this invention will become apparent to those skilled in the art from the material herein disclosed.

I have found that the salts of isobutyric acid in relatively small quantities in combination with water-soluble copper salts inhibits the growth of such above-noted pathogens. I have further found that when small quantities of specific salts of isobutyric acid in combination with such copper salts are added to an animal's feed ration, the animal shows a significant rate of weight gain superior to that of animals not receiving the additive.

As the term is used herein, "isobutyrate" refers to isobutyric acid and its salts. Isobutyric acid is operable per se in this invention. As a matter of fact, when its salts are used, apparently they hydrolyze to isobutyric acid and the respective base, so that the effective component may still be isobutyric acid and/or the isobutyrate ion. The salts of isobutyric acid are in general preferred to the acid per se because they have less odor and are more readily stored, shipped and handled. Although the isobutyrate salts in general are effective, the salts of Groups I and II of the Periodic Table as well as the ammonium salt, are preferred. The sodium and potassium salts are particularly useful and effective.

The water-soluble copper salts are generally operable in this invention. Such salts include, for example, the acetate, bromate, bromide, chlorate, chloride, lactate, nitrate, salicylate, and the like. In general, the cupric salts are more water-soluble than their cuprous counterparts.

I have found that there is a synergistic effect between isobutyrates and water-soluble copper salts. For example, when 100 ppm $CuSO_4$ is prepared in a liquid broth medium and inoculated with *Candida albicans*, the growth of *Candida albicans* is unaffected. Otherwise, when 1.0 percent by weight ammonium isobutyrate is prepared in a liquid medium, the growth of *Candida albicans* is unaffected. However, when the liquid medium contains 100 pmm $CuSO_4$ and 1.0 percent by weight ammonium isobutyrate, the growth of *Candida albicans* is effectively inhibited as can be seen from Table I, Example 9.

Examination of Table I reveals that the following ranges of the two components are effective in successfully inhibiting the growth of *Candida albicans*: 0.5–2.0% by weight ammonium isobutyrate and 50–200 ppm $CuSO_4$.

I have also found that in addition to the ammonium salt, the potassium, sodium and magnesium salts of isobutyric acid also are effective in inhibiting the growth of *Candida albicans* in combination with copper sulfate or other water-soluble copper salt. Additionally, other pathogens whose growth is inhibited by the instant invention include *Salmonella* species and *Escherichia coli*.

I prefer to treat the infected animal, particularly poultry, with the composition of this invention by admixing the poultry feed with 0.5 to 2.0 percent by weight isobutyrate and 50 to 200 ppm copper sulfate based on the weight of the composition. When these particular ranges are used, I have found that, in addition to curing this infection, there is also a rate of weight gain increase in the animal being treated as will be seen from the following examples.

The combination described above as added to the site which is to be protected by either dusting, applying a slurry, or spraying of the feedstuffs, so that 0.1 to 5.0 percent by weight of the total diet will be the combination heretofore described.

When administering the pathogen growth inhibitor to animals I have found several methods of introduction to the animal are satisfactory. In one convenient method the pathogen growth inhibitor is introduced into the animal as a feed supplement by spraying the pathogen growth inhibitor onto the feedstuff, so that 0.1–5.0 percent of the animals daily diet contains the pathogen growth inhibitor. Of course, the percentage of pathogen growth inhibitor in the daily feed will vary with the particular animal. For example, 0.5 to 4.0 percent by weight of the pathogen growth inhibitor in the daily diet is effective for chickens.

I have found, therefore, that small quantities of salts of isobutyric acid in combination with water-soluble copper salts are effective in inhibiting the growth of pathogenic organisms. Additionally, when animals are fed an additive containing a salt of isobutyric acid and copper sulphate there is a significant weight gain and although I am uncertain as to why this is so, it is quite possible that the weight gain is a result of the salt inhibiting the proliferation of pathogens.

In summation then, I have found that when 0.1 to 5.0 weight percent (based upon the total weight on an animal's daily diet) of an additive is included in an animal's daily diet (the weight ratio of additive to feedstuff is therefore 0.001–0.05:1), the growth of certain pathogens in animals is inhibited. The additive comprises 99.96–99.99 weight percent of an isobutyrate (as defined heretofore herein) and 0.01–0.04 weight percent of a water-soluble copper salt (as defined heretofore). The weight ratio of the copper salt to isobutyrate which is effective is in the range of 0.00025–0.0004:1. Also, 0.5–2.0 percent by weight isobutyrate and 50–200 ppm copper sulfate (based on the weight of the feedstuff) are together effective to accelerate the growth of the animal eating the feedstuff.

The following examples will aid in explaining the present invention but are intended to be illustrative only, and not limiting.

EXAMPLE 1

(1—a) An agar medium containing 1.0 percent by weight ammonium isobutyrate and 100 ppm copper sulfate was poured into a petri dish. *Candida albicans*, a well-known pathogen which was isolated from a chicken exhibiting digestive disorders, was streaked onto the solidified agar. After a 2-week period it was found that growth of the pathogen had not occurred. At the same time *Candida albicans* which was applied to agar medium in petri dishes (1–b) with 100 ppm copper sulfate but without the ammonium isobutyrate, (1–c) with 1.0% ammonium isobutyrate but without the copper sulfate, and (1–d) without either the ammonium isobutyrate or copper sulfate, each showed substantial growth of pathogen.

EXAMPLES 2–4

Example 1–a was repeated except that the potassium (Example 2), sodium (Example 3) and magnesium (Example 4) salts of isobutyric acid were substituted for ammonium isobutyrate. Similar results were obtained.

EXAMPLES 5–7

Example 1–a was repeated except that three species of *Salmonella*, *S. typhimurium* (Example 5), *S. gallinarum* (Example 6) and *S. pullorum* (Example 7) were substituted for *Candida albicans*. None of the petri dishes showed any sign of growth of *Salmonella* although control samples prepared in the same manner and treated in the same way as Examples 1–b, 1–c and 1–d contained substantial growth.

EXAMPLE 8

Example 1–a was repeated except that *Escherichia coli* was substituted for *Candida albicans*. The results were similar to those attained in Example 1–a.

EXAMPLE 9

Liquid broth culture medium containing different combinations of ammonium isobutyrate and copper sulfate were prepared and inoculated with *Candida albicans* as in Example 1–a. Table I below gives the results of the various combinations used and shows the synergistic effect which is attained.

TABLE I

In Vitro Inhibitory Effects of Combinations of $CuSO_4$ and $NH_4$-Isobutyrate on *Candida Albicans*\*

$CuSO_4$ (ppm)

| $NH_4$-isobutyrate (weight percent) | 0 | 25 | 50 | 100 | 200 | 400 | 800 |
|---|---|---|---|---|---|---|---|
| 0     | + | + | + | + | + | -- | -- |
| 0.062 | + | + | + | + | + | -- | -- |
| 0.125 | + | + | + | + | + | 31 | -- |
| 0.25  | + | + | + | + | + | -- | -- |
| 0.5   | + | + | + | + | -- | -- | -- |
| 1.0   | + | + | + | -- | -- | 104 | 31 | -- |
| 2.0   | + | + | -- | -- | -- | -- | -- |

\* (The top horizontal row represents susceptibility to $CuSO_4$ alone; left vertical column represents susceptibility to $NH_4$-isobutyrate alone. Inhibitory concentration of mixture: 200 ppm of $CuSO_4$ plus 0.5 percent of $NH_4$-isobutyrate. Symbol: + = growth in tube; -- = no visible growth.

EXAMPLE 10

Triplicate pens of Hubbard "white mountain" cockerels were reared on a regular commercially available control diet containing 22 percent protein and 2 percent sucrose. The composition of the feed and percentage of each ingredient used were as follows:

| | |
|---|---|
| Soybean Meal | 35.0% |
| Ground Corn | 55.63% |
| Salt | 0.5% |
| Lime | 1.37% |
| Dicalcium phosphate | 2.0% |
| Fat | 4.0% |
| Vitamins | 1.5% |
| Minerals premix* | |

*(Vitamins A, $D_3$, $D_2$, E, $B_{12}$, Riboflavin, Niacin, D-pantothenic acid, Menadione sodium bisulfite, $D_1$-Methionine, Ethoxyquin, Choline chloride.

At the same time, identical triplicate pens were used and dietary additions were made at the expense of the sucrose. One group was therefore, fed a control diet, and a second group was fed substantially the same diet containing 0.1 percent ammonium isobutyrate, a third group was fed substantially the same diet containing 0.5 percent ammonium isobutyrate and 200 ppm copper sulfate, and a fourth group was fed the diet containing 200 ppm copper sulfate, and a fifth group was fed the diet containing 2.0 percent ammonium isobutyrate and 50 ppm copper sulfate. The results as seen in Table II show that the chickens fed the diets containing both ammonium isobutyrate and copper sulfate gained more weight than when neither, or only one of, ammonium isobutyrate or copper sulfate was present in the diet.

TABLE II

Effects of Ammonium Isobutyrate in Growing Chickens — Dose Response

| Group No. | Treatment | Gain[1] g/chick | Feed[a] Efficiency |
|---|---|---|---|
| 1 | Control | 728 | 1.55 |
| 2 | +0.5% $NH_4$ isobutyrate | 696 | 1.52 |
| 3 | +0.5% $NH_4$ isobutyrate and 200 ppm copper sulfate | 734 | 1.54 |
| 4 | +200 ppm copper sulfate | 727 | 1.51 |
| 5 | +2.0% $NH_4$ isobutyrate and 50 ppm copper sulfate | 723 | 1.54 |

[1] Total gain per chick per 4 week experimental period. Each number is the average of 24 chicks.

[a] g Feed divided by g gain, average of 3 replications.

What is claimed is:

1. The method of inhibiting the growth of animal pathogens in animals, said pathogens being selected from the group consisting of *Candida albicans*, *Salmonella* species and *Escherichia coli*, which comprises adding to the animal's daily diet 0.1 to 5.0 weight percent based upon the total weight of the animal's daily diet of an additive, said additive consisting essentially of 99.96 to 99.99 weight percent of isobutyric acid or a salt thereof and 0.01 to 0.04 weight percent of a water-soluble copper salt.

2. The method according to claim 1 in which the isobutyl-rate is selected from the group consisting of ammonium, calcium, sodium, magnesium and potassium isobutyrate and the copper salt is copper sulfate.

3. The composition comprising a feedstuff and an amount of an additive to inhibit the growth of an animal pathogen selected from the group consisting of *Candida albicans*, *Salmonella* species, and *Escherichia coli*, said additive consisting essentially of 99.96 to 99.99 weight percent of isobutyric acid or a salt thereof and 0.01 to 0.04 weight percent of a water-soluble copper salt.

4. The composition according to claim 3 wherein the isobutyrate is selected from the group consisting of ammonium, calcium, sodium, magnesium, and potassium isobutyrate, and the copper salt is copper sulfate.

5. A composition of matter according to claim 4 in which the weight ratio of copper sulfate: group member is in the range of 0.00025–0.0004:1.

6. A composition consisting essentially an animal feedstuff plus an amount of an additive comprising copper sulfate and ammonium isobutyrate effective to accelerate growth of the animal eating the feedstuff.

7. The composition according to claim 6 wherein the feedstuff is selected from the group consisting of ground corn, cracked corn, whole corn, milo, peanut meal, cottonseed meal, wheat, and silage.

8. The composition according to claim 6 wherein the ratio of additive to feedstuff is 0.001 to 0.05:1.

9. The composition according to claim 6 which contains 0.5 to 2.0 percent by weight isobutyrate and 50 to 200 ppm copper sulfate based upon the total weight of the composition.

* * * * *